United States Patent
Lo

(10) Patent No.: US 8,811,810 B2
(45) Date of Patent: Aug. 19, 2014

(54) MONITORING CAMERA AND OPERATION METHOD THEREOF

(75) Inventor: Chung-Ming Lo, Hsinchu (TW)

(73) Assignee: Alpha Networks Inc., Hsinchu (TW)

( * ) Notice: Subject to any disclaimer, the term of this patent is extended or adjusted under 35 U.S.C. 154(b) by 24 days.

(21) Appl. No.: 13/346,859

(22) Filed: Jan. 10, 2012

(65) Prior Publication Data

US 2012/0201527 A1 Aug. 9, 2012

(30) Foreign Application Priority Data

Feb. 8, 2011 (TW) .............................. 100104127 A

(51) Int. Cl.
*G03B 7/00* (2014.01)
*H04N 5/235* (2006.01)
*H04N 5/238* (2006.01)
*H04N 5/232* (2006.01)

(52) U.S. Cl.
CPC ......... *H04N 5/23245* (2013.01); *H04N 5/2351* (2013.01); *H04N 5/238* (2013.01)
USPC ...................................................... 396/213

(58) Field of Classification Search
CPC ................................................ H04N 5/23245
See application file for complete search history.

(56) References Cited

U.S. PATENT DOCUMENTS

| | | | | |
|---|---|---|---|---|
| 2002/0152557 A1* | 10/2002 | Elberbaum | ........................ | 8/405 |
| 2005/0141117 A1* | 6/2005 | Kim et al. | ...................... | 359/892 |
| 2009/0091640 A1* | 4/2009 | Kim et al. | ...................... | 348/239 |
| 2011/0249120 A1* | 10/2011 | Bingle et al. | .................. | 348/148 |
| 2011/0292259 A1* | 12/2011 | Namba et al. | ................. | 348/294 |
| 2012/0236150 A1* | 9/2012 | Camilleri et al. | ............. | 348/148 |

FOREIGN PATENT DOCUMENTS

| | | |
|---|---|---|
| CN | 201440690 U | 4/2010 |
| CN | 201491117 U | 5/2010 |
| KR | 10-0970750 B1 | 7/2010 |
| TW | 200727047 | 7/2007 |
| TW | I302194 | 10/2008 |
| TW | M379292 | 4/2010 |
| TW | M396548 | 1/2011 |

OTHER PUBLICATIONS

Taiwan Patent Office Search Report, Taiwan, Nov. 25, 2013.

* cited by examiner

*Primary Examiner* — Clayton E Laballe
*Assistant Examiner* — Linda B Smith
(74) *Attorney, Agent, or Firm* — WPAT, PC; Justin King

(57) ABSTRACT

A monitoring camera and an operation method thereof are provided. The monitoring camera includes a light sensor, a voltage comparing unit and a reference voltage generating unit. The light sensor senses an environment brightness of the monitoring camera and generates an induced current accordingly. The voltage comparing unit generates a sensing voltage according to the induced current and compares the sensing voltage and a reference voltage to obtain a first comparison result, so that the monitoring camera can determine whether to perform at least one of a plurality of mode switching operations according to the first comparison result. The reference voltage generating unit outputs the first reference voltage and determines whether to reduce the first reference voltage according to the first comparison result.

12 Claims, 1 Drawing Sheet

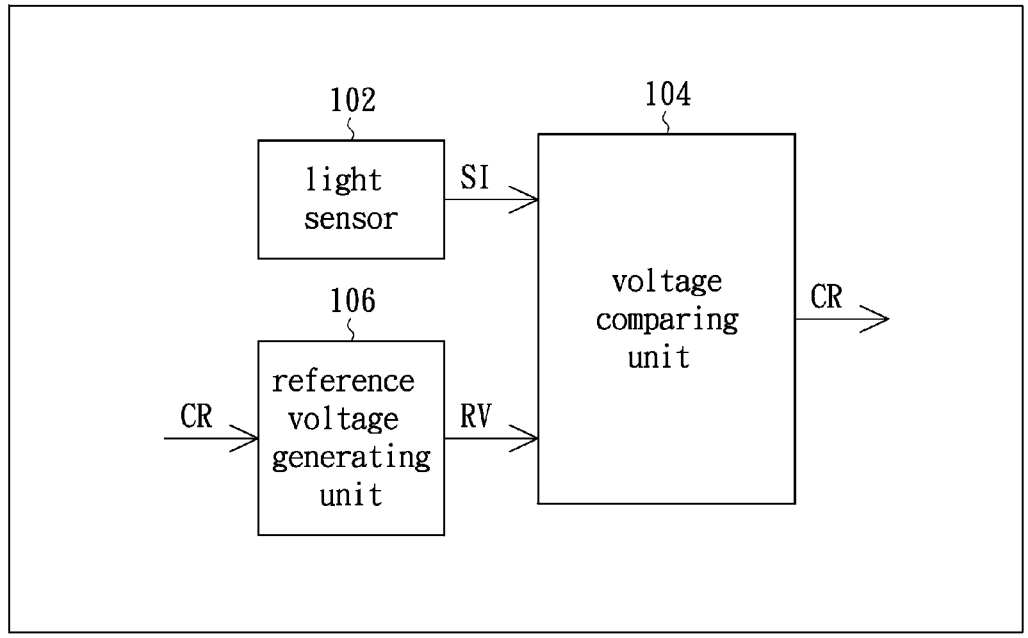

MONITORING CAMERA AND OPERATION METHOD THEREOF

FIELD OF THE INVENTION

The present invention generally relates to a field of monitoring technologies, and more particularly to a monitoring camera and an operation method thereof.

BACKGROUND OF THE INVENTION

The existing day-and-night monitoring cameras are commonly equipped with a light sensor, so as to determine whether to perform an IR-cut (Infrared-cut) filter switching operation or to turn on IR LEDs (Light Emitting Diodes) according to the environment brightness sensed by the light sensor. However, the drawback of the existing day-and-night monitoring cameras is that the image always has an overexposure issue or an underexposure issue when the amount of light passing through the lens of the monitoring camera alters with a modulation of a focal length of the lens. Thus, the light sensor of the monitoring camera cannot operate properly.

Although the industry in this field has developed a technology capable of determining whether to perform the IR-cut filter switching operation or to turn on the IR LEDs in accordance with the image brightness, this technology still has a flaw that the image brightness cannot be further utilized to determine whether to perform the IR-cut filter switching operation or to turn on the IR LEDs when the IR LEDs have been turned on.

SUMMARY OF THE INVENTION

The present invention relates to a monitoring camera, which is capable of operating properly when the focal length of the lens is modulated.

The present invention also relates to an operation method for the aforementioned monitoring camera.

The present invention provides a monitoring camera. The monitoring camera comprises a light sensor, a voltage comparing unit and a reference voltage generating unit. The light sensor is configured to sense an environment brightness of the monitoring camera and generate an induced current accordingly. The voltage comparing unit is configured to generate a sensing voltage according to the induced current correspondingly and generate a first comparison result according to a comparison between the sensing voltage and a first reference voltage, so that the monitoring camera can determine whether to perform at least one of a plurality of mode switching operations according to the first comparison result. The reference voltage generating unit is configured to output the first reference voltage and determine whether to reduce the first reference voltage according to the first comparison result.

In one embodiment of the monitoring camera, the mode switching operations comprise an IR emission operation, an IR-cut filter switching operation and a black/white image mode switching operation.

In one embodiment of the monitoring camera, when the first comparison result indicates that the sensing voltage is lower than the first reference voltage, the monitoring camera performs one of the IR emission operation, the IR-cut filter switching operation and the black/white image mode switching operation accordingly, and the reference voltage generating unit reduces the first reference voltage, so as to form a second reference voltage.

In one embodiment of the monitoring camera, the voltage comparing unit further generates a second comparison result according to a comparison between the sensing voltage and the second reference voltage, so that the monitoring camera can determine whether to perform another one of the IR emission operation, the IR-cut filter switching operation and the black/white image mode switching operation according to the second comparison result, and the reference voltage generating unit can determine whether to reduce the second reference voltage according to the second comparison result.

In one embodiment of the monitoring camera, when the second comparison result indicates that the sensing voltage is lower than the second reference voltage, the monitoring camera performs another one of the IR emission operation, the IR-cut filter switching operation and the black/white image mode switching operation accordingly, and the reference voltage generating unit reduces the second reference voltage, so as to form a third reference voltage.

In one embodiment of the monitoring camera, the voltage comparing unit further generates a third comparison result according to a comparison between the sensing voltage and the third reference voltage, so that the monitoring camera can determine whether to perform the one that has not been performed yet in the IR emission operation, the IR-cut filter switching operation and the black/white image mode switching operation according to the third comparison result.

In one embodiment of the monitoring camera, when the third comparison result indicates that the sensing voltage is lower than the third reference voltage, the monitoring camera performs the one that has not been performed yet in the IR emission operation, the IR-cut filter switching operation and the black/white image mode switching operation.

The present invention also provides an operation method for a monitoring camera. The monitoring camera has a light sensor for sensing an environment brightness of the monitoring camera and generating an induced current accordingly. The operation method comprises the following steps: generating a sensing voltage according to the induced current correspondingly and generating a first comparison result according to a comparison between the sensing voltage and a first reference voltage, so that the monitoring camera can determine whether to perform at least one of a plurality of mode switching operations according to the first comparison result; and determining whether to reduce the first reference voltage according to the first comparison result.

In one embodiment of the operation method, the mode switching operations comprise an IR emission operation, an IR-cut filter switching operation and a black/white image mode switching operation.

In one embodiment of the operation method, when the first comparison result indicates that the sensing voltage is lower than the first reference voltage, the monitoring camera is controlled to perform one of the IR emission operation, the IR-cut filter switching operation and the black/white image mode switching operation accordingly, and the first reference voltage is reduced, so as to form the second reference voltage.

In one embodiment of the operation method, the operation method further comprises the following steps: generating a second comparison result according to a comparison between the sensing voltage and the second reference voltage; determining whether to perform another one of the IR emission operation, the IR-cut filter switching operation and the black/white image mode switching operation according to the second comparison result; and determining whether to reduce the second reference voltage according to the second comparison result.

In one embodiment of the operation method, when the second comparison result indicates that the sensing voltage is lower than the second reference voltage, the monitoring camera is controlled to perform another one of the IR emission operation, the IR-cut filter switching operation and the black/white image mode switching operation accordingly, and the second reference voltage is reduced, so as to form a third reference voltage.

In one embodiment of the operation method, the operation method further comprises the following steps: generating a third comparison result according to a comparison between the sensing voltage and the third reference voltage; and determining whether to perform the one that has not been performed yet in the IR emission operation, the IR-cut filter switching operation and the black/white image mode switching operation according to the third comparison result.

In one embodiment of the operation method, when the third comparison result indicates that the sensing voltage is lower than the third reference voltage, the monitoring camera is controlled to perform the one that has not been performed yet in the IR emission operation accordingly, the IR-cut filter switching operation and the black/white image mode switching operation.

In the present invention, the monitoring camera includes a light sensor, a voltage comparing unit and a reference voltage generating unit. The voltage comparing unit generates a sensing voltage according to an induced current generated by the light sensor, and the voltage comparing unit compares the sensing voltage and the first reference voltage to generate a first comparison result. Thus, the monitoring camera can determine whether to perform at least one of a plurality of mode switching operations according to the first comparison result. The mode switching operations comprise an IR emission operation, an IR-cut filter switching operation and a black/white image mode switching operation. In addition, in the present invention, the reference voltage generating unit outputs the first reference voltage and determines whether to reduce the first reference voltage to obtain a second reference voltage according to the first comparison result. Therefore, when the environment brightness is getting lower, the voltage comparing unit can further compare the sensing voltage and the second reference voltage to generate a second comparison result, so that the monitoring camera can determine whether to perform the one that has not been performed yet in the mode switching operations according to the second comparison result.

Since the induced current generated by the light sensor alters with the environment brightness, and the voltage level of the reference voltage alters with the induced current generated by the light sensor, the action range of the light sensor of the monitoring camera will changes correspondingly when the focal length of a lens of the monitoring camera changes. Therefore, the monitoring camera can operate appropriately.

BRIEF DESCRIPTION OF THE DRAWINGS

The above objects and advantages of the present invention will become more readily apparent to those ordinarily skilled in the art after reviewing the following detailed description and accompanying drawings, in which:

FIG. 1 is a diagram that schematically illustrates a monitoring camera in accordance with an embodiment of the present invention; and FIG. 2 is a flow chart that schematically depicts an operation method of the monitoring camera in accordance with an embodiment of the present invention.

DETAILED DESCRIPTION OF PREFERRED EMBODIMENTS

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

FIG. 1 is a diagram that schematically illustrates a monitoring camera in accordance with an embodiment of the present invention. As shown in FIG. 1, the monitoring camera 100 comprises a light sensor 102, a voltage comparing unit 104 and a reference voltage generating unit 106. The light sensor 102 and the reference voltage generating unit 106 are both electrically connected to the voltage comparing unit 104.

In the aforementioned structure, the light sensor 102 is configured to sense an environment brightness of the monitoring camera 100 and generate an induced current SI accordingly. The voltage comparing unit 104 is configured to generate a sensing voltage (not shown) according to the induced current SI and generate a comparison result CR (this current comparison result CR is also referred as a first comparison result) according to a comparison between the sensing voltage and a reference voltage RV (this current reference voltage RV is also referred as a first reference voltage), so that the monitoring camera 100 can determine whether to perform at least one of a plurality of mode switching operations according to the comparison result CR. The mode switching operations comprise an IR emission operation, an IR-cut filter switching operation and a black/white image mode switching operation. The reference voltage generating unit 106 is configured to output the reference voltage RV and determine whether to reduce the reference voltage RV according to the comparison result CR.

Assuming that the IR emission operation, the IR-cut filter switching operation and the black/white image mode switching operation in this embodiment are respectively performed in three different phases, the monitoring camera 100 can perform one of the IR emission operation, the IR-cut filter switching operation and the black/white image mode switching operation, and the reference voltage generating unit 106 can reduce the current reference voltage RV to obtain a second reference voltage when the comparison result CR indicates that the sensing voltage is lower than the reference voltage RV (i.e., when the current environment brightness is lower than the environment brightness corresponding to the current reference voltage RV).

Therefore, when the environment brightness of the monitoring camera 100 is getting lower, the voltage comparing unit 104 can further compare the current sensing voltage and the reduced reference voltage RV and generate a comparison result CR (this current comparison result CR is also referred as a second comparison result) accordingly, so that the monitoring camera 100 can determine whether to perform another one of the IR emission operation, the IR-cut filter switching operation and the black/white image mode switching operation according to the current comparison result CR, and the reference voltage generating unit 106 can determine whether to further reduce the reference voltage RV according to the current comparison result CR.

When the current comparison result CR indicates that the current sensing voltage is lower than the current reference voltage RV (i.e., when the current environment brightness is lower than the environment brightness corresponding to the current reference voltage RV), the monitoring camera 100 can perform another one of the IR emission operation, the IR-cut filter switching operation and the black/white image mode switching operation, and the reference voltage generating unit 106 can further reduce the current reference voltage RV to obtain a third reference voltage.

Therefore, when the environment brightness of the monitoring camera 100 is still getting lower, the voltage comparing unit 104 can further compare the current sensing voltage and the current reference voltage RV and generate a comparison result CR (this current comparison result CR is also referred as a third comparison result) accordingly, so that the monitoring camera 100 can determine whether to perform the one that has not been performed yet in the IR emission operation, the IR-cut filter switching operation and the black/white image mode switching operation according to the current comparison result CR.

When the current comparison result CR indicates that the current sensing voltage is lower than the current reference voltage RV (i.e., when the current environment brightness is lower than the environment brightness corresponding to the current reference voltage RV), the monitoring camera 100 can perform the one that has not been performed yet in the IR emission operation, the IR-cut filter switching operation and the black/white image mode switching operation.

According to the aforementioned description, the operation process of the monitoring camera of the present invention can be summarized into several basic operation steps as shown in FIG. 2. FIG. 2 is a flow chart of an operation method of the monitoring camera in accordance with an embodiment of the present invention. The monitoring camera comprises a light sensor, and the light sensor is configured to sense an environment brightness of the monitoring camera and generate an induced current accordingly. As shown in FIG. 2, the operation method comprises the following steps: generating a sensing voltage according to the induced current correspondingly and generating a first comparison result according to a comparison between the sensing voltage and a first reference voltage, so that the monitoring camera can determine whether to perform a mode switching operation according to the first comparison result (step S202); and determining whether to reduce the first reference voltage according to the first comparison result (step S204).

In the aforementioned description, the reference voltage RV is reduced twice, and the action range of the light sensor is modulated twice accordingly. However, the skilled person in the art should notice that the modulation of the reference voltage RV can be performed only one time or at least three times, so that the action range of the light sensor can alter with the modulation accordingly. In addition, in the aforementioned description, the IR emission operation, the IR-cut filter switching operation and the black/white image mode switching operation are respectively performed in three different phases. However, the skilled person in the art should notice that the IR emission operation, the IR-cut filter switching operation and the black/white image mode switching operation can be respectively performed in two phases. For example, the IR emission operation and the IR-cut filter switching operation can be firstly performed at the same time, and the black/white image mode switching operation can be performed when the environment brightness is still getting lower.

To sum up, in the present invention, the monitoring camera includes a light sensor, a voltage comparing unit and a reference voltage generating unit. The voltage comparing unit generates a sensing voltage according to an induced current generated by the light sensor, and the voltage comparing unit compares the sensing voltage and the first reference voltage to generate a first comparison result. Thus, the monitoring camera can determine whether to perform at least one of a plurality of mode switching operations according to the first comparison result. The mode switching operations comprises an IR emission operation, an IR-cut filter switching operation and a black/white image mode switching operation. In addition, in the present invention, the reference voltage generating unit outputs the first reference voltage and determines whether to reduce the first reference voltage to obtain a second reference voltage according to the first comparison result. Therefore, when the environment brightness is getting lower, the voltage comparing unit can further compare the sensing voltage and the second reference voltage to generate a second comparison result, so that the monitoring camera can determine whether to perform the one that has not been performed in the mode switching operations according to the second comparison result.

Since the induced current generated by the light sensor alters with the environment brightness, and the voltage level of the reference voltage alters with the induced current, the action range of the light sensor of the monitoring camera will changes correspondingly when the focal length of a lens of the monitoring camera changes. Therefore, the monitoring camera can operate appropriately.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A monitoring camera comprising:
 a light sensor for sensing an environment brightness of the monitoring camera and generating an induced current accordingly;
 a voltage comparing unit, electrically connected to the light sensor for generating a sensing voltage according to the induced current correspondingly and generating a first comparison result according to a comparison between the sensing voltage and a first reference voltage, so that the monitoring camera can determine whether to perform at least one of a plurality of mode switching operations according to the first comparison result; and
 a reference voltage generating unit for outputting the first reference voltage and determining whether to reduce the first reference voltage according to the first comparison result;
 wherein the mode switching operations comprise an IR emission operation, an IR-cut filter switching operation and a black/white image mode switching operation, and when the first comparison result indicates that the sensing voltage is lower than the first reference voltage, the monitoring camera performs one of the IR emission operation, the IR-cut filter switching operation and the black/white image mode switching operation accordingly, and the reference voltage generating unit reduces the first reference voltage, so as to form a second reference voltage.

2. The monitoring camera according to claim 1, wherein the voltage comparing unit further generates a second comparison result according to a comparison between the sensing voltage and the second reference voltage, so that the monitoring camera can determine whether to perform another one of the IR emission operation, the IR-cut filter switching operation and the black/white image mode switching operation according to the second comparison result, and the reference voltage generating unit can determine whether to reduce the second reference voltage according to the second comparison result.

3. The monitoring camera according to claim 2, wherein when the second comparison result indicates that the sensing voltage is lower than the second reference voltage, the monitoring camera performs another one of the IR emission operation, the IR-cut filter switching operation and the black/white image mode switching operation accordingly, and the reference voltage generating unit reduces the second reference voltage, so as to form a third reference voltage.

4. The monitoring camera according to claim 3, wherein the voltage comparing unit further generates a third comparison result according to a comparison between the sensing voltage and the third reference voltage, so that the monitoring camera can determine whether to perform the one that has not been performed yet in the IR emission operation, the IR-cut filter switching operation and the black/white image mode switching operation according to the third comparison result.

5. The monitoring camera according to claim 4, wherein when the third comparison result indicates that the sensing voltage is lower than the third reference voltage, the monitoring camera performs the one that has not been performed yet in the IR emission operation, the IR-cut filter switching operation and the black/white image mode switching operation.

6. An operation method applied to a monitoring camera with a light sensor, the light sensor being used for sensing an environment brightness of the monitoring camera and generating an induced current accordingly, the operation method comprising:
   generating a sensing voltage according to the induced current correspondingly and generating a first comparison result according to a comparison between the sensing voltage and a first reference voltage, so that the monitoring camera can determine whether to perform at least one of a plurality of mode switching operations according to the first comparison result; and
   determining whether to reduce the first reference voltage according to the first comparison result;
   wherein the mode switching operations comprise an IR emission operation, an IR-cut filter switching operation and a black/white image mode switching operation, and when the first comparison result indicates that the sensing voltage is lower than the first reference voltage, the monitoring camera performs one of the IR emission operation, the IR-cut filter switching operation and the black/white image mode switching operation accordingly, and the reference voltage generating unit reduces the first reference voltage, so as to form a second reference voltage.

7. The operation method according to claim 6 further comprising:
   generating a second comparison result according to a comparison between the sensing voltage and the second reference voltage;
   determining whether to perform another one of the IR emission operation, the IR-cut filter switching operation and the black/white image mode switching operation according to the second comparison result; and
   determining whether to reduce the second reference voltage according to the second comparison result.

8. The operation method according to claim 7, wherein when the second comparison result indicates that the sensing voltage is lower than the second reference voltage, the monitoring camera is controlled to perform another one of the IR emission operation, the IR-cut filter switching operation and the black/white image mode switching operation accordingly, and the second reference voltage is reduced, so as to form a third reference voltage.

9. The operation method according to claim 8 further comprising:
   generating a third comparison result according to a comparison between the sensing voltage and the third reference voltage; and
   determining whether to perform the one that has not been performed yet in the IR emission operation, the IR-cut filter switching operation and the black/white image mode switching operation according to the third comparison result.

10. The operation method according to claim 9, wherein when the third comparison result indicates that the sensing voltage is lower than the third reference voltage, the monitoring camera is controlled to perform the one that has not been performed yet in the IR emission operation, the IR-cut filter switching operation and the black/white image mode switching operation.

11. An operation method applied to a monitoring camera with a light sensor, the light sensor being used for sensing an environment brightness of the monitoring camera and generating an induced current accordingly, the operation method comprising:
    generating a sensing voltage according to the induced current correspondingly and generating a first comparison result according to a comparison between the sensing voltage and a first reference voltage, so that the monitoring camera can determine whether to perform at least one of a plurality of mode switching operations according to the first comparison result; and
    determining whether to reduce the first reference voltage according to the first comparison result;
    wherein when the first comparison result indicates that the sensing voltage is lower than the first reference voltage, the monitoring camera performs one of the plurality of mode switching operations accordingly, and the reference voltage generating unit reduces the first reference voltage, so as to form a second reference voltage.

12. The operation method according to claim 11, wherein the mode switching operations comprise an IR emission operation, an IR-cut filter switching operation and a black/white image mode switching operation.

* * * * *